United States Patent
Harley

(10) Patent No.: US 7,684,564 B2
(45) Date of Patent: Mar. 23, 2010

(54) METHOD FOR SOLVING FROBENIUS EQUATIONS FOR ELLIPTIC-CURVE CRYPTOGRAPHY

(76) Inventor: Robert Joseph Harley, 4, rue de l'Ermitage, Sèvres (FR) 92310

( * ) Notice: Subject to any disclaimer, the term of this patent is extended or adjusted under 35 U.S.C. 154(b) by 1218 days.

(21) Appl. No.: 10/733,320

(22) Filed: Dec. 12, 2003

(65) Prior Publication Data

US 2004/0120520 A1    Jun. 24, 2004

Related U.S. Application Data

(60) Provisional application No. 60/433,658, filed on Dec. 16, 2002.

(51) Int. Cl.
*H04K 1/00* (2006.01)
(52) U.S. Cl. .......................... 380/30; 380/28
(58) Field of Classification Search ................. 380/255, 380/28
See application file for complete search history.

(56) References Cited

U.S. PATENT DOCUMENTS 6,748,410 B1 *  6/2004  Gressel et al. .............. 708/491
7,031,468 B2 *  4/2006  Hoffstein et al. .............. 380/28
7,158,569 B1 *  1/2007  Penner ........................ 375/240

OTHER PUBLICATIONS

Fouquet, Mireille et al.; "An Extension of Satoh's Algorithm and Its Implementation"; 2000, Ecole Polytechnique, 20 pages.*
Satoh, Takakazu; "The Canonical Lift of an Ordinary Elliptic Curve over a Finite Field and Its Point Counting"; 2000, Dept. Math. Fac. Sci., Saitama University Japan, 14 pages.*

* cited by examiner

*Primary Examiner*—Nasser G Moazzami
*Assistant Examiner*—Carlton V Johnson
(74) *Attorney, Agent, or Firm*—Townsend and Townsend and Crew LLP

(57) ABSTRACT

The present invention comprises fast new methods for computing high-precision solutions of Frobenius equations that arise in elliptic-curve cryptography. In particular, this invention may be used to accelerate the computation of the number of points on an elliptic curve over a finite field. The advantage over methods in prior art is that the invention is faster than previously known methods. The methods enable optimally fast canonical lifting of elliptic curves defined over finite fields, optimally fast pre-computations to determine an efficient representation of intermediate quantities, and optimally fast lifting of finite-field elements to compute multiplicative representatives. Furthermore the invention enables rapid computation of norms and traces amongst other applications.

21 Claims, 2 Drawing Sheets

First part for precision n.

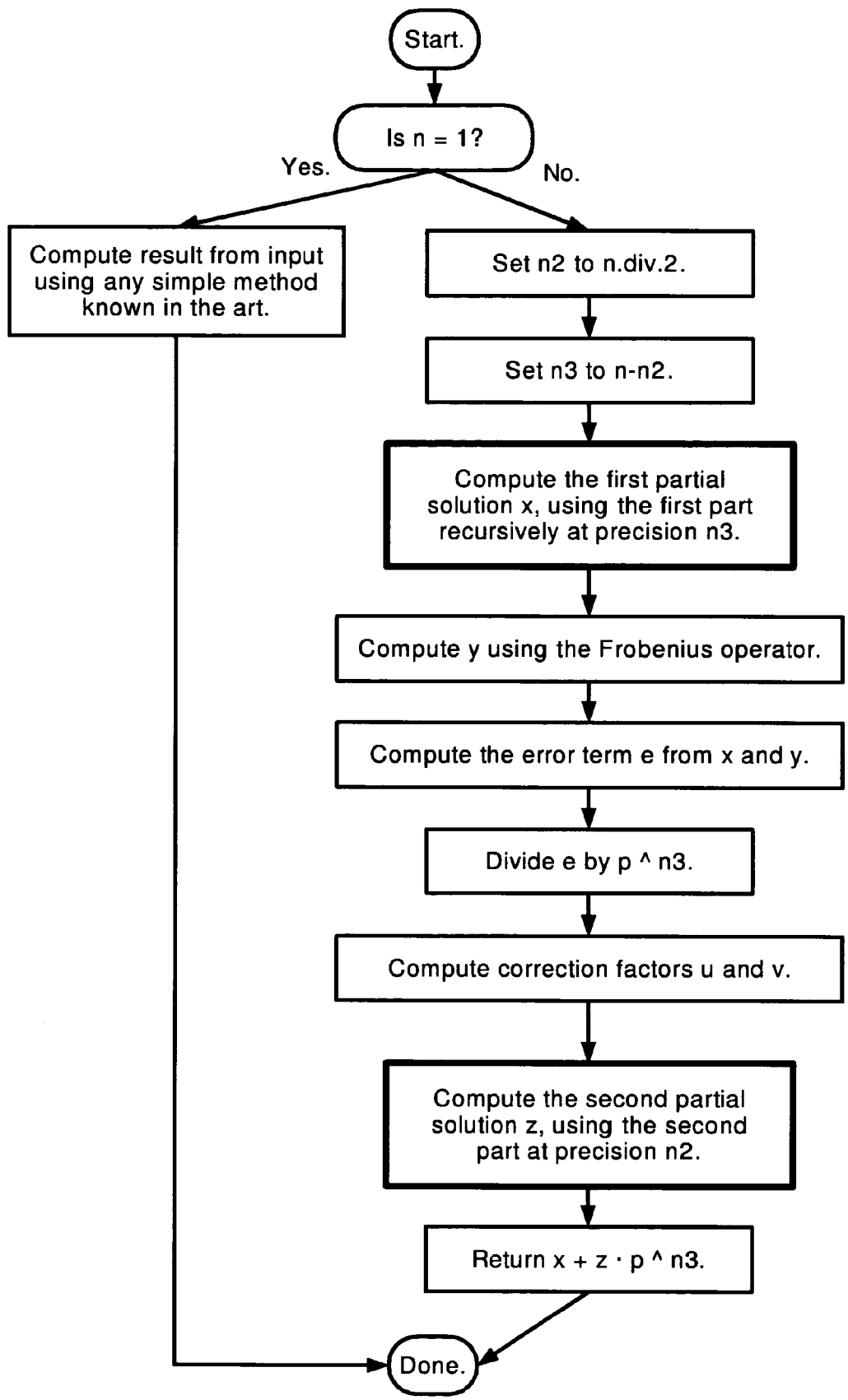
Figure 1: First part for precision n.

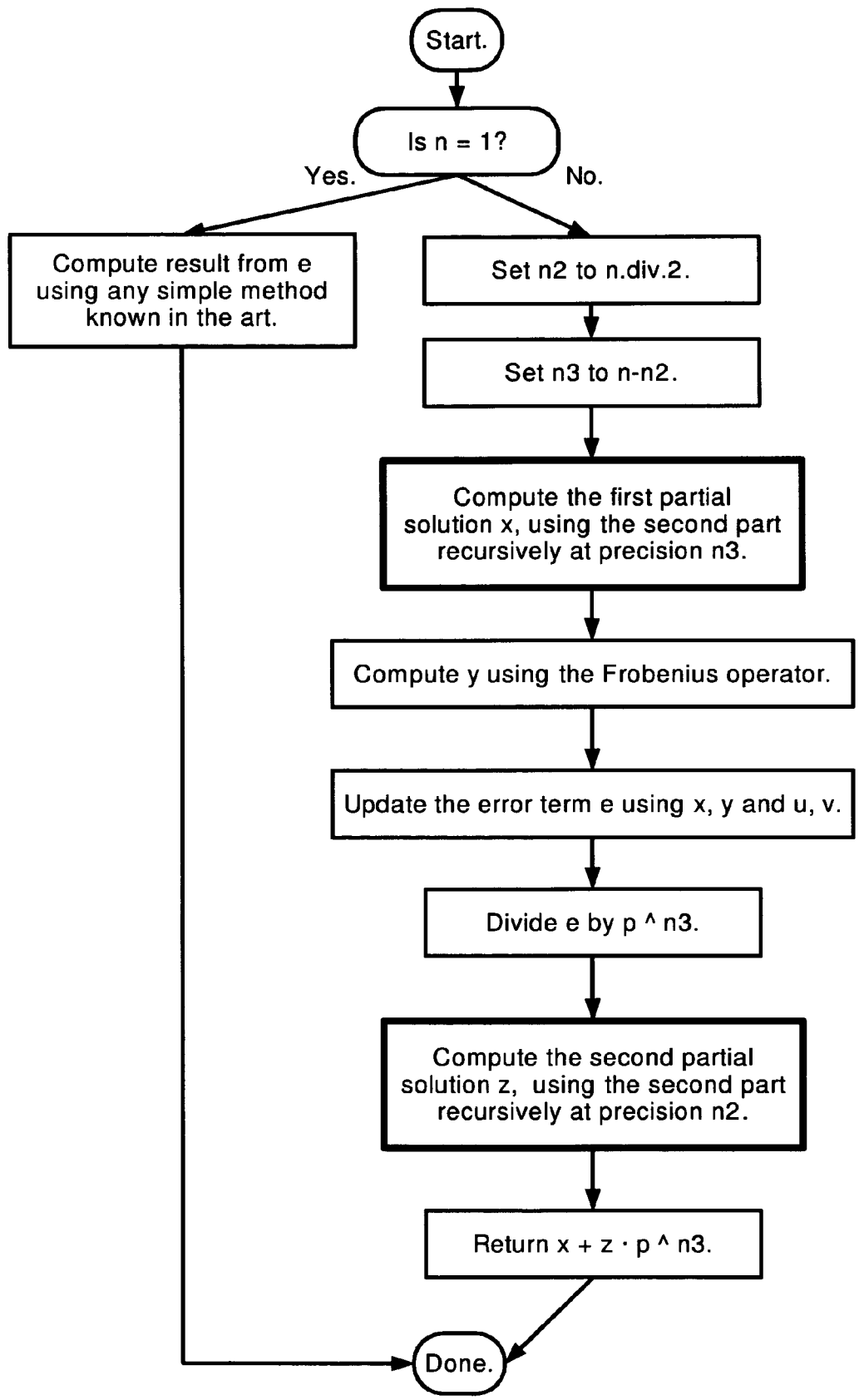
Figure 2: Second part for precision n, with error term e and correction factors u and v.

METHOD FOR SOLVING FROBENIUS EQUATIONS FOR ELLIPTIC-CURVE CRYPTOGRAPHY

CROSS-REFERENCE TO RELATED APPLICATIONS

This application claims priority from co-pending U.S. Provisional Patent Application No. 60/433,658 filed Dec. 16, 2002 entitled "Method for solving Frobenius equations with applications to cryptography" which is hereby incorporated by reference, as if set forth in full, for all purposes.

STATEMENT REGARDING FEDERALLY SPONSORED RESEARCH OR DEVELOPMENT

Not Applicable.

REFERENCE TO SEQUENCE LISTING, A TABLE OR A COMPUTER PROGRAM LISTING COMPACT DISK APPENDIX

Not Applicable.

BACKGROUND OF THE INVENTION

Field of Invention

The present invention relates to Elliptic-Curve Cryptography (ECC) and more particularly to the computation of the number of points on elliptic curves over finite fields of small characteristic such as binary fields, and to the generation of secure curves.

Since ECC was proposed in the mid-1980s by Koblitz and Miller following work of Lenstra, its security and efficiency have been subject to intense interest. One of the initial steps in ECC protocols is to pick a suitable curve. To ensure that the crypto-system is secure, the curve must be chosen to have a number of points which is divisible by a large prime number. To check this, it is necessary to know the exact number of points on the curve.

The ability to generate new secure elliptic curves is deemed to be highly desirable. For instance in U.S. Pat. No. 6,141,420, Vanstone et al. write:

"The elliptic curve cryptography method has a number of benefits. First, each person can define his own elliptic curve for encryption and decryption, which gives rise to increased security. If the private key security is compromised, the elliptic curve can be easily redefined and new public and private keys can be generated to return to a secure system. In addition, to decrypt data encoded with the method, only the parameters for the elliptic curve and the session key need be transmitted."

To maximize security one should avoid choosing curves from particular families of curves with special properties that might be used to crack the system, and instead examine random candidate curves. Finding a secure curve requires testing many candidates. The candidates can be pre-filtered by an early-abort strategy; however even with this, Johnson and Menezes [JM1999] recently described the process as a "complicated and cumbersome task" requiring "a few hours on a workstation" for 200 bits.

In practice it remained difficult to generate new secure curves dynamically until Satoh suggested a so-called "p-adic" algorithm for computing the number of points on elliptic curves over finite fields of small characteristic, see [Sat2000]. Improvements due to Fouquet, Gaudry and Harley, to Skjernaa and to Vercauteren, Preneel and Vandewalle, accelerated Satoh's algorithm by a constant factor, extended its domain of application and reduced its memory usage. These algorithms allowed secure curves to be generated more rapidly than had been possible previously, see [FGH2000], [FGH2001], [Skj2000] and [VPV2001]. This approach culminated in the AGM method invented by Mestre and Harley and protected by U.S. patent Ser. No. 10/172,776 (pending), see [MeHa2001].

The present invention comprises a family of fast new methods for computing quantities required in p-adic point-counting algorithms, that improves on methods known in the art. Such algorithms compute certain intermediate quantities which are larger than the input or the output. An initial pre-computation determines an efficient representation for the intermediate quantities (and perhaps other auxiliary data) once and for all. Then in the main computation, a first phase lifts an elliptic curve given as input in order to determine certain intermediate quantities, and a second phase computes a norm to determine the number of points on the curve as output. The present invention provides new methods for accelerating the pre-computation, the lift phase, the norm phase or any combination of these.

For ECC with keys of size d, the size of intermediate quantities computed by p-adic algorithms is determined by the degree d and by their precision n. Satoh's algorithm and the variants indicated above require approximately d arithmetic operations at full precision n. An improved method invented by Satoh, Skjernaa and Taguchi carries out many computations at medium precision and reduces the run-time to the equivalent of about .sqrt.(n) operations (here .sqrt. denotes the square root), see [SST2001]. Gaudry combined this SST method with the AGM method, see [Gau2002]. However the present invention allows almost all computations to be carried out at very low precision and thereby reduces the run-time further, to the equivalent of about .log.(n) arithmetic operations or less (here .log. denotes the logarithm). For instance when n is 1024 then .sqrt.(n) is 32, whereas .log.(n) is just 10.

The p-adic algorithms known in the art permit lifting of elliptic curves, and furthermore Satoh extended the SST method to compute multiplicative representatives of finite-field elements, see [Sat2002]. Several forms of the present invention accelerate the lifting of elliptic curves and/or of finite-field elements but also accelerate computation of efficient representations for intermediate quantities. The resulting run-times are the best currently known in practice, and are optimal in the sense that they cannot be improved by more than a logarithmic factor. Other forms of the invention provide new fast methods for computing traces and norms, albeit not optimally.

Table 1 below lists the various references referred to in this specification, as follows:

TABLE 1

| Reference | Authors, title, and location. |
| --- | --- |
| [BB1987] | Jonathan Borwein, Peter Borwein. "Pi and the AGM, A Study in Analytic Number Theory and Computational Complexity." Canadian Math. Society Series of Monographs and Advanced Texts (1987). |
| [FGH2000] | Mireille Fouquet, Pierrick Gaudry, Robert Harley. "An extension of Satoh's algorithm and its implementation." Journal of the Ramanujan Mathematical Society (2000), vol. 15, pp. 281-318. |

TABLE 1-continued

| Reference | Authors, title, and location. |
|---|---|
| [FGH2001] | Mireille Fouquet, Pierrick Gaudry, Robert Harley. "Finding Secure Curves with the Satoh-FGH Algorithm and an Early-Abort Strategy." In: Advances in Cryptology—EUROCRYPT 2001. Lecture Notes in Computer Science (2001), vol. 2045, pp. 14-29. |
| [Gau2002] | Pierrick Gaudry. "A Comparison and a Combination of SST and AGM Algorithms for Counting Points of Elliptic Curves in Characteristic 2". In: Advances in Cryptology—ASIACRYPT 2002. Lecture Notes in Computer Science (2002), vol. 2501, pp. 311-327. |
| [JM1999] | Don Johnson, Alfred Menezes. "The elliptic curve digital signature algorithm (ECDSA)." University of Waterloo (1999), Technical Report CORR 99-34. |
| [MeHa2001] | Jean-François Mestre, Robert Harley. "Method for generating secure elliptic curves using an arithmetic-geometric mean iteration." U.S. Pat. No. 10/172,776 (pending). |
| [SST2001] | Takakazu Satoh, Bent Skjernaa, Yuichiro Taguchi. "Fast Computation of Canonical Lifts of Elliptic curves and its Application to Point Counting." (Preprint). |
| [Sat2000] | Takakazu Satoh. "The canonical lift of an ordinary elliptic curve over a finite field and its point counting." Journal of the Ramanujan Mathematical Society (2000), vol. 15, pp. 247-270. |
| [Sat2002] | Takakazu Satoh. "On p-adic point counting algorithms for elliptic curves over finite fields." In: Algorithmic number theory, 5th international symposium, ANTS-V. Lecture Notes in Computer Science (2002), vol. 2369, pp. 43-66. |
| [Skj2000] | Berit Skjernaa. "Satoh's algorithm in characteristic 2." Mathematics of Computation (2003), vol. 72, pp. 477-487. |
| [VMA1997] | Scott Vanstone, Ronald Mullin, Gordon Agnew. "Elliptic curve encryption systems." U.S. Pat. No. 6,141,420. |
| [VPV2001] | Frederik Vercauteren, Bail Preneel, Joos Vandewalle. "A Memory Efficient Version of Satoh's Algorithm." In: Advances in Cryptology—EUROCRYPT 2001. Lecture Notes in Computer Science (2001), vol. 2045, pp. 1-13. |

BRIEF SUMMARY OF THE INVENTION

An object of the present invention is to provide new methods for accelerating the determination of the number of points on elliptic curves over finite fields of small characteristic.

A second object of the present invention is to thereby enable the rapid generation of secure elliptic curves for use in elliptic-curve cryptography by making use of the accelerated methods.

A third object of the present invention is to ensure that the methods described herein be implementable in devices which may be constrained in the amount of program memory available or in the amount of random-access memory available or in the processing power available or some combination of these.

To these ends, the present invention provides new methods for computing quantities in p-adic point-counting algorithms, which are significantly faster than prior art methods while being efficient in terms of program size and memory usage. Each method consists of a process for computing high-precision solutions of Frobenius equations, as specified in the "Detailed Description of the Invention" below. A brief outline is given next for purposes of exposition.

In order to compute a solution at precision n, the process is split into two parts. Each part initially computes a partial solution to half precision by calling itself recursively and then applies a Frobenius operator to the result. The first part computes an error term and correction factors from the partial result, whereas the second part uses previously computed correction factors to update the error term. Then each part computes a second partial result recursively. Finally each part combines the partial results into a full-precision result. This process is illustrated by the pseudo-code example below, and by FIGS. 1 and 2.

First part for precision n:
If n is 1 then compute the result from the input by any simple method known in the art.
Otherwise:
Set n2 to n.div.2 and n3 to n−n2.
Compute the first partial solution x using the first part recursively at precision n3.
Compute y using a Frobenius operator.
Compute the error term e from x and y, then divide it by p^n3.
Compute correction factors u and v.
Compute the second partial solution z using the second part at precision n2.
Return x+z·p^n3.
End.

Second part for precision n with error term e and correction factors u and v:
If n is 1 then compute the result from e by any simple method known in the art.
Otherwise:
Set n2 to n.div.2 and n3 to n−n2.
Compute the first partial solution x using the second part recursively at precision n3.
Compute y using a Frobenius operator.
Update the error term e using x, y and u, v, then divide it by p^n3.
Compute the second partial solution z using the second part recursively, precision n2.
Return x+z·p^n3.
End.

In a device carrying out the process, the precision used for the partial solutions decreases rapidly at each recursive step. In particular, only a fixed number of operations are performed at full precision. Twice as many are performed at half precision, four times as many at one quarter precision and so on. After .log.(n) recursive steps, the precision used becomes so low that small partial solutions may easily be computed by processes known in the art. It follows that almost all computations are performed at low precision.

The inventive aspects of the present invention, relative to methods known from prior art, include the above-described use of low precision arithmetic operations for computing the desired solutions efficiently. For comparison, the SST method employs a looping structure in which approximately .sqrt.(n) operations are performed at full precision n and approximately n operations are performed at medium precision .sqrt.(n).

Various modifications will occur to those skilled in the art. For instance the precision of partial solutions may be increased slightly to take into account loss of precision arising from the correction factors. In some cases the two parts can be merged into one. The recursion can be simulated with a stack. The method can be structured to use three or more partial results rather than two. Further details of the invention will become readily apparent from the detailed description below.

The present invention can be embodied in several modes:

In one mode, a p-adic point-counting algorithm implements pre-computation using the first form of the invention specified in the detailed description below.

In another mode, a p-adic point-counting algorithm implements a lift phase using the second form of the invention specified in the detailed description below.

In another mode, a p-adic point-counting algorithm implements a norm phase using the third, fourth and/or fifth form of the invention specified in the detailed description below.

In another mode, the pre-computation and/or several of the two phases are implemented using the various forms of the invention.

In each case, remaining computations are implemented by other methods such as ones existing in prior art.

In practice the invention may be embodied as program code such as a C language program running on a general purpose microprocessor (as is the case for existing prototypes at the time of filing). Another envisaged embodiment is as a program running on a constrained device such as a smart-card chip. Another envisaged embodiment is a hardware design, either a dedicated design implementing the entire method or a design providing hardware assistance for some critical portions of it.

Intermediate results of a process using the present invention are sequences of coefficients taking the tangible form of bit-string values stored in registers or memory cells of a device carrying out the process. The final result is an integer value taking the tangible form of bit-string values stored in registers or memory cells of such a device. The foregoing and other features and advantages of the present invention will become apparent from the detailed description given below.

BRIEF DESCRIPTION OF THE SEVERAL VIEWS OF THE DRAWING

FIG. 1 is a flowchart of a sequence of steps of the first part of a process implementing a method of the invention.

FIG. 2 is a flowchart of a sequence of steps of the second part of a process implementing a method of the invention.

DETAILED DESCRIPTION OF THE INVENTION

The present invention provides new methods for accelerating the determination of the number of points on elliptic curves over finite fields of small characteristic. The following describes preferred embodiments of the invention.

Several abstract structures are defined for the purposes of exposition. However they each have a concrete representation in a device implementing the invention.

Let p be a prime integer and let Zp denote the integers considered modulo successive powers of p, also known as p-adic integers. Let $f(x)$ be a polynomial of degree d with coefficients in Zp whose top coefficient is one and that is irreducible modulo p. Let q be $p^d$ (the symbol ^ denotes taking a power). Let Zq denote the polynomials over Zp considered modulo $f(x)$.

Concretely, elements in Zp and in Zq are represented to some working precision in a device implementing the invention. An element in Zp is represented to precision n by storing the first n digits in an array in the natural way. An element in Zq is represented to precision n by storing it's coefficients in an array of d elements, each of which is an element in Zp to precision n. For efficiency purposes, $f(x)$ can be chosen to be sparse. Other representations are clearly possible.

Let Fq be the finite field of q elements with the representation that follows naturally by considering Zq modulo p. Further details relating to representation issues and standard arithmetic operations are omitted, as they are conventional and well known in the art.

As is usual the Teichmüller lift for elements maps a given finite-field element x to the multiplicative representative $w(x)$ in Zq that coincides with x modulo p and such that $w(x)^q$ is equal to $w(x)$. The Frobenius operation, S, maps a sum $w(x_i) \cdot p^i$ to the sum $w(x_i)^p \cdot p^i$. The Teichmüller lift for polynomials maps a given polynomial modulo p to a polynomial whose roots are multiplicative representatives.

A Frobenius equation is a polynomial equation in variables x and y where y is assumed to equal $S(x)$. Preferred embodiments of the present invention employ the forms listed below to compute high-precision solutions of such equations.

A first form determines the Teichmüller lift for polynomials by solving a Frobenius equation with the invention, under the further assumption that y is equal to $x^p$. When p is two the equation has the form $f(y)=f(x) \cdot f(-x)$ or else $-f(x) \cdot f(-x)$. More generally the right hand side is the product of $f(x \cdot z)$ where z ranges over p-th roots of one, scaled to ensure that the top coefficient is one. This method is illustrated by the following pseudo-code, where the input is a given field polynomial modulo p.

First part for precision n:
If n is 1 then return the given field polynomial.
Otherwise:
  Set n2 to n.div.2 and n3 to n−n2.
  Compute the first partial solution f using the first part recursively at precision n3.
  Split $f(x)$ into $g(x^2)+x \cdot h(x^2)$.
  Set g to $g^2$ and h to $h^2$.
  If d is even then set error term e to $f-g+x \cdot h$, otherwise to $f+g-x \cdot h$.
  Divide e by $2^{n3}$.
  Set the correction factor t to f.
  Compute the second partial solution i using the second part at precision n2.
  Return $f+i \cdot 2^{n3}$.
End.

Second part for precision n with error term e and correction factor t:
If n is 1 then return e.
Otherwise:
  Set n2 to n.div.2 and n3 to n−n2.
  Compute the first partial solution f using the second part recursively at precision n3.
  Split $f(x)$ into $g(x^2)+x \cdot h(x^2)$.
  Split $t(x)$ into $u(x^2)+x \cdot v(x^2)$.
  If d is even then update the error term e to $e+f+2 \cdot g \cdot u-2 \cdot h \cdot v \cdot x$, otherwise to $e+f-2 \cdot g \cdot u+2 \cdot h \cdot v \cdot x$.
  Divide e by $2^{n3}$.
  Compute the second partial solution i using the second part recursively, precision n2.
  Return $f+i \cdot 2^{n3}$.
End.

Note that the solution computed is f, not x. The resulting f allows the Frobenius operator to be applied efficiently to an element $a(x)$ by reducing $a(x^2)$ modulo $f(x)$.

A second form determines the canonical lift of an elliptic curve by solving a Frobenius equation with the invention, where the equation has the form of a modular polynomial. When p is two, the equation can be chosen to be the AGM modular equation $(1+x)^2 \cdot y^2 - 4 \cdot x$, and more generally such equations are known in the art, see [BB1987]. Here we substitute x and y with $8 \cdot x+1$ and $8 \cdot y+1$ to avoid increasing intermediate precisions. As is clear to those skilled in the art, this approach is advantageous although not strictly necessary. This method is illustrated by the following pseudo-code. The input is the non-zero coefficient a of an elliptic curve $y^2 + x \cdot y = x^3 + a$.

First part for precision n:
If n is 1 then return a.
Otherwise:
  Set n2 to n.div.2 and n3 to n−n2.
  Compute the first partial solution x using the first part recursively at precision n3.
  Set y to S(x) using Frobenius operator.
  Set t to $x+2 \cdot y+8 \cdot x \cdot y$.
  Set the error term e to $t^2+4 \cdot x \cdot y+y$ and divide it by $2^{n3}$.
  Set the first correction factor u to $2 \cdot t+4 \cdot y+16 \cdot t \cdot y$.
  Set the second correction factor v to $(4 \cdot t+1) \cdot (4 \cdot x+1)$.
  Compute the second partial solution z using the second part at precision n2.
  Return $x+z \cdot 2^{n3}$.
End.

Second part for precision n with error term e and correction factors u and v:
If n is 1 then return .sqrt.(e) in F.sub.q.
Otherwise:
  Set n2 to n.div.2 and n3 to n−n2.
  Compute the first partial solution x using the second part recursively at precision n3.
  Set y to S(x) using Frobenius operator.
  Update the error term e to $e+u \cdot x+v \cdot y$ and divide it by $2^{n3}$.
  Compute the second partial solution z using the second part recursively, precision n2.
  Return $x+z \cdot 2^{n3}$.
End.

A third form determines the multiplicative representative of an element x by solving a Frobenius equation with the invention, where the equation has the form $y=x^p$. This form is similar to the previous one; details are omitted as being analogous to those known in the art.

A fourth form determines the trace of an element z of Zq by solving a Frobenius equation with the invention, where the equation has the form $y \cdot x = z−k$. When p is two and d is odd one constrains k to be a p-adic integer so that the desired trace is $k \cdot d$. This method is illustrated by the following pseudo-code which computes k, and x if desired.

Method for precision n and input z:
If n is 1 then:
  Compute the trace k of z over Fq using methods known in the art.
  If x is required, solve $x^2−x=z−k$ modulo 2 using methods known in the art. (*)
  Return k, and x if required.
Otherwise:
  Set n2 to n.div.2 and n3 to n−n2.
  Compute the partial solutions k1 and x1 using the method recursively at precision n3.
  Set y to S(x) using Frobenius operator.
  Set z to $z−k+x−y$ and divide it by $2^{n3}$.
  Compute the partial solutions k2, and x2 if required, using the method at precision n2.
  Return $k1+k2 \cdot 2^{n3}$, and $x1+x2 \cdot 2^{n3}$ if required.
End.

Note that in this case, both parts are merged into one. Also, the computations marked (*) take just over $d^{(3/2)}$ bit-operations each, and thus determine the overall run-time.

A fifth form determines the norm of an element z of Zq by solving a Frobenius equation with the invention, where the equation has the form $y/x=z \cdot k$. When p is two and d is odd one constrains k to be a p-adic integer so that the desired norm is the inverse of $k^d$. This method is similar to the previous one; details are omitted as being analogous to those known in the art.

Other forms of the invention methods are clearly possible. While the invention has been described in connection with specific preferred embodiments, various modifications will occur to those skilled in the art without departing from the spirit of what is described herein.

Certain specific steps may be replaced by steps that can be seen to be equivalent by those skilled in the art, and such equivalent steps are also implied. The terms and expressions which have been employed here are used for purposes of description and not of limitation. There is no intention to exclude any equivalents of the various features shown and described. It should be understood that various modifications are possible within the scope of the invention. For example, the pseudo-code listed above merely shows possible selections of basic steps for achieving the invention. Steps can be added to, or taken from, those shown. Furthermore the steps shown can be modified. In general, many approaches to achieving the functionality of the invention are possible.

Any suitable programming language can be used. For example procedural, functional, imperative or object-oriented can be adopted. The steps can be performed serially or may overlap concurrently. The methods and aspects of the present invention can be practiced in a general-purpose computing environment or with distributed, embedded or co-processing architectures. Aspects of the invention need not be embodied in re-programmable computer readable media. Steps or functions described herein can be performed in hardware, software or a combination of the two. For example, hardware design can include application-specific integrated circuits (ASICs), field-programmable gate arrays (FPGAs), custom or semi-custom designs, discrete logic etc.

It is possible that the present invention can be practiced in other than electrical devices. For example, optical or biotechnology devices could be employed.

Thus the scope of the invention is to be determined solely by the claims.

What I claim as my invention is:

1. A computer-implemented method for computing the number of points on an elliptic curve, the method comprising:
  receiving an elliptic curve having a number of points on the curve;
  determining, with a processor, the number of points on the elliptic curve, wherein the determining includes solving a lifted Frobenius equation to a full precision by computing a plurality of partial solutions at a plurality of successively reduced precisions, wherein the solving includes:
    (a) computing, to a first reduced precision, a first partial solution of said lifted Frobenius equation,
    (b) applying a Frobenius operation to said first partial solution,
    (c) computing an error term for said lifted Frobenius equation using the first partial solution and/or a result of step (b),
    (d) computing correction factors for said lifted Frobenius equation using the first partial solution and/or a result of step (b), (e) computing, to the first reduced precision, a second partial solution of a modified lifted Frobenius equation using the error term, wherein computing the second partial solution includes:
  (1) computing, to another reduced precision, a third partial solution of said modified lifted Frobenius equation by recursively performing steps (1)-(5) to solve said modified lifted Frobenius equation from a lowest reduced precision to the another reduced precision, wherein the another reduced precision is less than the first reduced precision,
  (2) applying a Frobenius operation to said third partial solution,
  (3) updating said error term using results of steps (1) and (2) and the correction factors,
  (4) computing, to the another reduced precision, a fourth partial solution of said modified lifted Frobenius equation with the updated error term by recursively performing steps (1)-(5) to solve said modified lifted Frobenius equation with the updated error term from a lowest reduced precision to the another reduced precision, and
  (5) combining said third partial solution and said fourth partial solution to create the second partial solution,
(f) combining said first partial solution and said second partial solution; and
(g) repeating steps (a)-(f) one or more additional times to solve the lifted Frobenius equation to a full precision, wherein the result from step (f) is used as the first partial solution of step (a) for the next successively higher precision; and
based on the number of points on the elliptic curve, generating a cryptographic key for use in a digital processing system.

2. The method of claim 1 in which each successive precision is one half of the previous precision.

3. The method of claim 1 in which steps (a)-(f) and (1)-(5) compute the Teichmüller lift of a given finite-field polynomial.

4. The method of claim 1 in which steps (a)-(f) and (1)-(5) compute the canonical lift of said elliptic curve.

5. The method of claim 1 in which steps (a)-(f) and (1)-(5) compute the multiplicative representative of a given finite-field element.

6. The method of claim 1 in which steps (a)-(f) and (1)-(5) compute the trace of a given p-adic number.

7. The method of claim 1 in which steps (a)-(f) and (1)-(5) compute the norm of a given p-adic number.

8. The method of claim 1, further comprising:
receiving a sequence of elliptic curves and determining the number of points on each elliptic curve.

9. The method of claim 8, further comprising:
generating a cryptographic key for use in a digital processing system using one of the secure elliptic curves based on the values for the number of points for the elliptic curves.

10. The method of claim 1, further comprising:
based on the number of points, identifying whether the elliptic curve is a secure elliptic curve for generating a cryptographic key.

11. The method of claim 1, further comprising:
storing the number of points on the elliptic curve in a memory of the computer.

12. A computer readable medium embodying program code for executing by one or more processors to perform an operation for computing the number of points on an elliptic curve, the operation comprising:
receiving an elliptic curve having a number of points on the curve;
determining the number of points on the elliptic curve, wherein the determining includes solving a lifted Frobenius equation to a full precision by computing a plurality of partial solutions at a plurality of successively reduced precisions, wherein the solving includes:
(a) computing, to a first reduced precision, a first partial solution of said lifted Frobenius equation,
(b) applying a Frobenius operation to said first partial solution,
(c) computing an error term for said lifted Frobenius equation using the first partial solution and/or a result of step (b),
(d) computing correction factors for said lifted Frobenius equation using the first partial solution and/or a result of step (b),
(e) computing, to the first reduced precision, a second partial solution of a modified lifted Frobenius equation using the error term, wherein computing the second partial solution includes:
  (1) computing, to another reduced precision, a third partial solution of said modified lifted Frobenius equation by recursively performing steps (1)-(5) to solve said modified lifted Frobenius equation from a lowest reduced precision to the another reduced precision, wherein the another reduced precision is less than the first reduced precision,
  (2) applying a Frobenius operation to said third partial solution,
  (3) updating said error term using results of steps (1) and (2) and the correction factors,
  (4) computing, to the another reduced precision, a fourth partial solution of said modified lifted Frobenius equation with the updated error term by recursively performing steps (1)-(5) to solve said modified lifted Frobenius equation with the updated error term from a lowest reduced precision to the another reduced precision, and
  (5) combining said third partial solution and said fourth partial solution to create the second partial solution,
(f) combining said first partial solution and said second partial solution; and
(g) repeating steps (a)-(f) one or more additional times to solve the lifted Frobenius equation to a full precision, wherein the result from step (f) is used as the first partial solution of step (a) for the next successively higher precision; and
based on the number of points on the elliptic curve, generating a cryptographic key for use in a digital processing system.

13. The computer readable medium of claim 12, wherein the operation further comprises:
based on the number of points, identifying whether the elliptic curve is a secure elliptic curve for generating a cryptographic key.

14. The computer readable medium of claim 12 wherein each successive precision is one half of the previous precision.

15. The computer readable medium of claim 12, wherein the operation further comprises:
receiving a sequence of elliptic curves and determining the number of points on each elliptic curve.

16. The computer readable medium of claim 15, wherein the operation further comprises:

generating a cryptographic key for use in a digital processing system using one of the secure elliptic curves based on the values for the number of points for the elliptic curves.

17. An integrated circuit configured to compute the number of points on an elliptic curve, the integrated circuit comprising:

hardware logic that receives an elliptic curve having a number of points on the curve;

hardware logic that determines the number of points on the curve, wherein the determining includes solving a lifted Frobenius equation to a full precision by computing a plurality of partial solutions at a plurality of successively reduced precisions, wherein the solving includes:

(a) computing, to a first reduced precision, a first partial solution of said lifted Frobenius equation, (b) applying a Frobenius operation to said first partial solution, (c) computing an error term for said lifted Frobenius equation using the first partial solution and/or a result of step (b), (d) computing correction factors for said lifted Frobenius equation using the first partial solution and/or a result of step (b), (e) computing, to the first reduced precision, a second partial solution of a modified lifted Frobenius equation using the error term, wherein computing the second partial solution includes:

(1) computing, to another reduced precision, a third partial solution of said modified lifted Frobenius equation by recursively performing steps (1)-(5) to solve said modified lifted Frobenius equation from a lowest reduced precision to the another reduced precision, wherein the another reduced precision is less than the first reduced precision;

(2) applying a Frobenius operation to said third partial solution, (3) updating said error term using results of steps (1) and (2) and the correction factors, (4) computing, to the another reduced precision, a fourth partial solution of said modified lifted Frobenius equation with the updated error term by recursively performing steps (1)-(5) to solve said modified lifted Frobenius equation with the updated error term from a lowest reduced precision to the another reduced precision, and (5) combining said third partial solution and said fourth partial solution to create the second partial solution, (f) combining said first partial solution and said second partial solution; and (g) repeating steps (a)-(f) one or more additional times to solve the lifted Frobenius equation to a full precision, wherein the result from step (f) is used as the first partial solution of step (a) for the next successively higher precision; and hardware logic that based on the number of points on the elliptic curve generates a cryptographic key for use in a digital processing system.

18. The integrated circuit of claim 17, further comprising:

hardware logic for identifying, based on the number of points, the elliptic curve as a secure elliptic curve for generating a cryptographic key.

19. The integrated circuit of claim 17, wherein each successive precision is one half of the previous precision.

20. The integrated circuit of claim 17, wherein the hardware logic receives a sequence of elliptic curves and determines the number of points on each elliptic curve.

21. The integrated circuit of claim 17, further comprising:

hardware logic that generates a cryptographic key for use in a digital processing system using one of the secure elliptic curves based on the values for the number of points for the elliptic curves.

* * * * *